(12) United States Patent
Kim (10) Patent No.: US 12,113,257 B2
(45) Date of Patent: *Oct. 8, 2024

(54) SYSTEM FOR STACKING FUEL CELLS

(71) Applicants: Hyundai Motor Company, Seoul (KR); Kia Corporation, Seoul (KR)

(72) Inventor: Tae Jin Kim, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 745 days.

This patent is subject to a terminal disclaimer.

(21) Appl. No.: 17/347,809

(22) Filed: Jun. 15, 2021

(65) Prior Publication Data

US 2022/0190375 A1 Jun. 16, 2022

(30) Foreign Application Priority Data

Dec. 10, 2020 (KR) .......................... 1020200172013

(51) Int. Cl.

| | |
|---|---|
| H01M 8/2404 | (2016.01) |
| B65G 57/03 | (2006.01) |
| H01M 8/241 | (2016.01) |
| H01M 8/2432 | (2016.01) |
| H01M 8/2465 | (2016.01) |
| H01M 8/248 | (2016.01) |
| H01M 8/10 | (2016.01) |

(52) U.S. Cl.
CPC .......... *H01M 8/2404* (2016.02); *B65G 57/03* (2013.01); *H01M 8/241* (2013.01); *H01M 8/2465* (2013.01); *H01M 2008/1095* (2013.01); *H01M 8/2432* (2016.02); *H01M 8/248* (2013.01)

(58) Field of Classification Search
CPC ...... H01M 8/24; H01M 8/2428; H01M 8/241; H01M 8/2418; H01M 8/2425; H01M 8/244; H01M 8/2465; H01M 8/2432; H01M 8/248

See application file for complete search history.

(56) References Cited

U.S. PATENT DOCUMENTS

| | | | |
|---|---|---|---|
| 11,545,692 B2 * | 1/2023 | Kim ..................... | H01M 8/241 |
| 2006/0127732 A1 * | 6/2006 | Yoshida .............. | H01M 8/2404 |
| | | | 29/623.1 |
| 2016/0365598 A1 * | 12/2016 | Ju ........................ | H01M 8/2404 |
| 2018/0159150 A1 * | 6/2018 | Kim ..................... | H01M 8/241 |
| 2019/0252712 A1 * | 8/2019 | Ju ........................ | H01M 8/248 |

* cited by examiner

*Primary Examiner* — Helen Oi K Conley
*Assistant Examiner* — Amanda Rosenbaum
(74) *Attorney, Agent, or Firm* — MCDONNELL BOEHNEN HULBERT & BERGHOFF LLP (57) ABSTRACT

A system for stacking fuel cells for a fuel cell stack includes a component part storage region to store the fuel cells, a finished product storage region to store a completed fuel cell stack transferred by an automated guided vehicle, and a plurality of stacking regions disposed between the component part storage region and the finished product storage region, where one side of each stacking region corresponding to the finished product storage region is formed as an entry and exit for the automated guided vehicle for the fuel cell stack, a stacking unit is disposed at each of remaining sides of the stacking region, and the stacking region is supplied with the fuel cells from the component part storage region by the automated guided vehicle to sequentially stack the fuel cells to manufacture the fuel cell stack.

16 Claims, 8 Drawing Sheets

SYSTEM FOR STACKING FUEL CELLS

CROSS-REFERENCE TO RELATED APPLICATIONS

This application claims priority to and the benefit of Korean Patent Application No. 10-2020-0172013 filed in the Korean Intellectual Property Office on Dec. 10, 2020, the entire contents of which are incorporated herein by reference.

TECHNICAL FIELD

The present disclosure relates to a system for stacking fuel cells.

BACKGROUND

In general, when water is electrolyzed, hydrogen and oxygen are generated, and a hydrogen fuel cell is a device that uses the reverse reaction of this electrolysis.

The hydrogen fuel cell refers to producing electricity by supplying hydrogen as fuel and reacting with oxygen in air.

Unlike general chemical batteries, these hydrogen fuel cells may continuously generate electricity as long as fuel and air are supplied, and have higher energy efficiency and no noise than the turbine power generation method using fossil fuels.

In addition, the hydrogen fuel cell is an environment-friendly energy source that generates less greenhouse gas, and is a new energy that may be applied in various fields such as transportation, power generation, home, and portable use.

A typical term of hydrogen fuel cell is used to indicate a combination of a plurality of cells rather than a single cell, and is also called a fuel cell battery, a fuel cell stack, and the like.

The cell for the hydrogen fuel cell battery is manufactured by stacking negative electrodes, negative electrode gaskets, gas diffusion layers, membrane electrode assemblies, and positive electrodes.

However, in the manufacture of a cell for a hydrogen fuel cell according to the prior art, the cathode electrode, the cathode electrode gasket, the gas diffusion layer, the membrane electrode assembly, and the anode electrode are stacked one by one by the operator's manual labor, or only local automation of stacking is available. Thus, the manufacturing of hydrogen fuel cells is not fully automated.

Typically, a large number of, e.g., more than 1000, sheets of the negative electrode, negative electrode gasket, gas diffusion layer, membrane electrode assembly, and positive electrode are stacked to form a hydrogen fuel cell stack, increasing the cycle time. Thus, cycle time is large, and productivity is deteriorated.

The above information disclosed in this Background section is only for enhancement of understanding of the background of the disclosure, and therefore it may contain information that does not form the prior art that is already known in this country to a person of ordinary skill in the art.

SUMMARY

A system for stacking fuel cells for a fuel cell stack may include, a component part storage region configured to store the fuel cells, a finished product storage region configured to store a completed fuel cell stack transferred by at least one automated guided vehicle (AGV), and a plurality of stacking regions disposed between the component part storage region and the finished product storage region, where a first transfer robot is located at a central portion of each stacking region, one side of each stacking region corresponding to the finished product storage region is formed as an entry and exit for the at least one automated guided vehicle for the fuel cell stack, a stacking unit is disposed at each of remaining sides of the stacking region, and the stacking region is supplied with the fuel cells from the component part storage region by the at least one automated guided vehicle to sequentially stack the fuel cells to manufacture the fuel cell stack.

The component part storage region may include a first tray that is multi-layered to store a plurality of types of fuel cells.

The finished product storage region may include second tray that is multi-layered to store the fuel cell stack.

The first transfer robot may be configured to assemble and package the fuel cell stack stacked in the stacking region, and transfers the fuel cell stack to the at least one automated guided vehicle.

The at least one automated guided vehicle may include a first automated guided vehicle moving between the component part storage region and the stacking region and a second automated guided vehicle moving between the first transfer robot and the finished product storage region.

The stacking unit may include a pair of loading portions each configured to seat the fuel cells supplied from the at least one automated guided vehicle, a stacking portion disposed between the pair of loading portions, and configured to sequentially stack the fuel cells transferred from the loading portion, and a transferring portion slidably mounted on a frame disposed above the pair of loading portions, and configured to, while moving between the loading portion and the stacking portion, simultaneously clamp fuel cells loaded in the loading portion and stack the clamped fuel cells in the stacking portion.

The loading portion may include a plurality of loading tables that vertically operate as the fuel cell is stacked, a vacuum adsorber disposed adjacent to the loading table, and configured to remove a slip sheet of the fuel cell transferred from corresponding loading table, through vacuum adsorption, and a vision camera disposed adjacent to the vacuum adsorber, and configured to picture the fuel cell removed with the slip sheet.

The loading table may include a first upper plate on which the fuel cells are stacked, a plurality of first guider bars installed to penetrate the first upper plate and configured to align the fuel cells stacked on the first upper plate, a first lower plate disposed below the first upper plate and fixed to the plurality of first guider bars, a first screw shaft installed at a central portion of a lower surface of the first upper plate, engaged with a first screw housing that is rotatably mounted on the first lower plate through a first bearing housing, and formed with a first bevel gear, and a first servo-motor engaged with the first bevel gear of the first screw shaft and configured to apply torque to the first screw shaft through the first screw housing to vertically operate the first upper plate.

The loading table may further include a first height sensor configured to operate forward and backward with respect to a first auxiliary plate fixed to the first upper plate and measure the height of the first upper plate.

The stacking portion may include a rotation plate disposed between the pair of loading portions, and configured to rotate through a rotation portion configured at a central portion of the rotation plate where a penetration hole is formed, a pair of stacking tables disposed at opposite sides of the rotation plate, and configured to sequentially stack the fuel cells transferred by the transferring portion to a preset quantity and vertically operate as the fuel cells are stacked, and a tester configured to perform a leakage test for the fuel cells stacked on the stacking table when connected to the stacking table having stacked the preset quantity of fuel cells by the rotation of the rotation plate.

The rotation portion may include a first rack gear formed at an interior circumference of the penetration hole, a first drive gear engaged with the first rack gear, a third servo-motor connected to the first drive gear and configured to transmit driving torque to the first drive gear, and a reducer connected to the third servo-motor and configured to reduce a rotation speed of third servo-motor.

The stacking table may include a second upper plate on which the fuel cells are stacked, a plurality of second guider bars installed to penetrate the second upper plate and configured to align the fuel cells stacked on the second upper plate, a second lower plate disposed below the second upper plate and fixed to the plurality of second guider bars, a second screw shaft installed at a central portion of a lower surface of the second upper plate, and configured to vertically operate by being engaged with a second screw housing that is rotatably mounted on the second lower plate through a second bearing housing, and a second servo-motor engaged with a second bevel gear formed at a frontal end portion of the second screw housing, and configured to apply torque to the second screw shaft through the second screw housing to vertically operate the second upper plate.

The stacking table may further include a second height sensor configured to operate forward and backward with respect to a second auxiliary plate fixed to the second upper plate, and measure a position of the second upper plate.

The tester may be mounted on the frame, and configured to, when the stacking table is positioned to a home position by the rotation of the rotation plate, move downward to the stacking table to be connected to the stacking table and inject gas into the fuel cells 10 stacked on the stacking table.

The transferring portion may include an LM guide slidably mounted on a rail of the frame, a horizontal movement block mounted on the LM guide, and configured to be movable by a second rack gear and a second drive gear engaged with the second rack gear, a fourth servo-motor mounted on the horizontal movement block, and configured to apply a driving torque to the second drive gear, and a plurality of adsorbers installed on the horizontal movement block, and configured to simultaneously vacuum adsorb the fuel cells loaded in the loading portion and stack the adsorbed fuel cells in the stacking portion.

The adsorber may include an adsorption plate configured to clamp and unclamp the fuel cell through vacuum adsorption and release, a vertical movement block connected to an upper portion of the adsorption plate, and configured to vertically operate through a third rack gear and a third drive gear engaged with the third rack gear, and a fifth servo-motor fixed to the horizontal movement block, and configured to apply a driving torque to the third drive gear.

According to a system for stacking the fuel cells according to an exemplary embodiment, a production line may be formed from supplying of the fuel cell to storing the completed fuel cell stack, and thereby it is possible to reduce labor costs and improve production quality.

In addition, according to a system for stacking the fuel cells 10 according to an exemplary embodiment, by optimally designing arrangement of working regions, movements of the first transfer robot 30 may be minimized. In addition, by disposing a loading portion at both sides of the stacking portion and employing a rotation plate, overall cycle time may be reduced, and productivity may be improved.

Other effects that may be obtained or are predicted by an exemplary embodiment will be explicitly or implicitly described in a detailed description of the present disclosure. That is, various effects that are predicted according to an exemplary embodiment will be described in the following detailed description.

DETAILED DESCRIPTION

The present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

In order to clarify the present disclosure, parts that are not related to the description will be omitted, and the same elements or equivalents are referred to with the same reference numerals throughout the specification.

In the following description, dividing names of components into first, second, and the like is to divide the names because the names of the components are the same as each other, and an order thereof is not particularly limited.

A system for stacking fuel cells 10 according to an exemplary embodiment may be used to manufacture a fuel cell stack 1.

Particularly, a system for stacking fuel cells 10 according to an exemplary embodiment may be applied to manufacture a hydrogen fuel cell stack 1.

Figure 1:
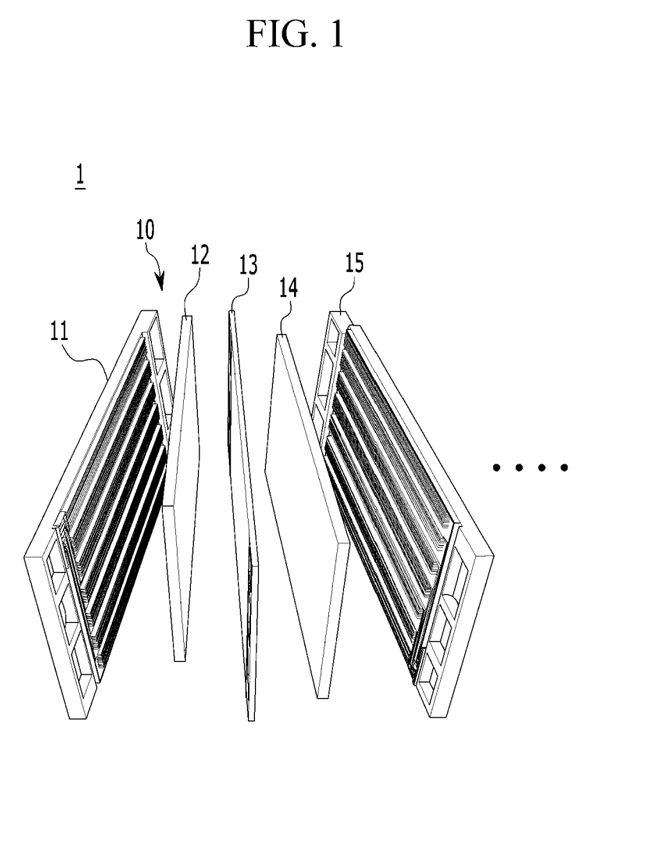
FIG. 1 is a general schematic diagram of a hydrogen fuel cell stack manufactured by a system for stacking fuel cells according to an exemplary embodiment.

FIG. 1 is a general schematic diagram of the hydrogen fuel cell stack 1 manufactured by a system for stacking fuel cells 10 according to an exemplary embodiment.

Referring to FIG. 1, the hydrogen fuel cell stack 1 may be manufactured by stacking generally 600 to 1000 pieces of fuel cells 10 formed of a gas diffusion layer 11, a positive electrode 12, a polymer electrolyte membrane 13, a negative electrode 14, and an oxygen diffusion layer 15.

That is, each fuel cell 10 includes the gas diffusion layer 11, the positive electrode 12, the polymer electrolyte membrane 13, the negative electrode 14, and the oxygen diffusion layer 15, and the fuel cell stack 1 is supposed to be formed by stacking generally 600 to 1000 pieces of the fuel cells 10.

Figure 2:
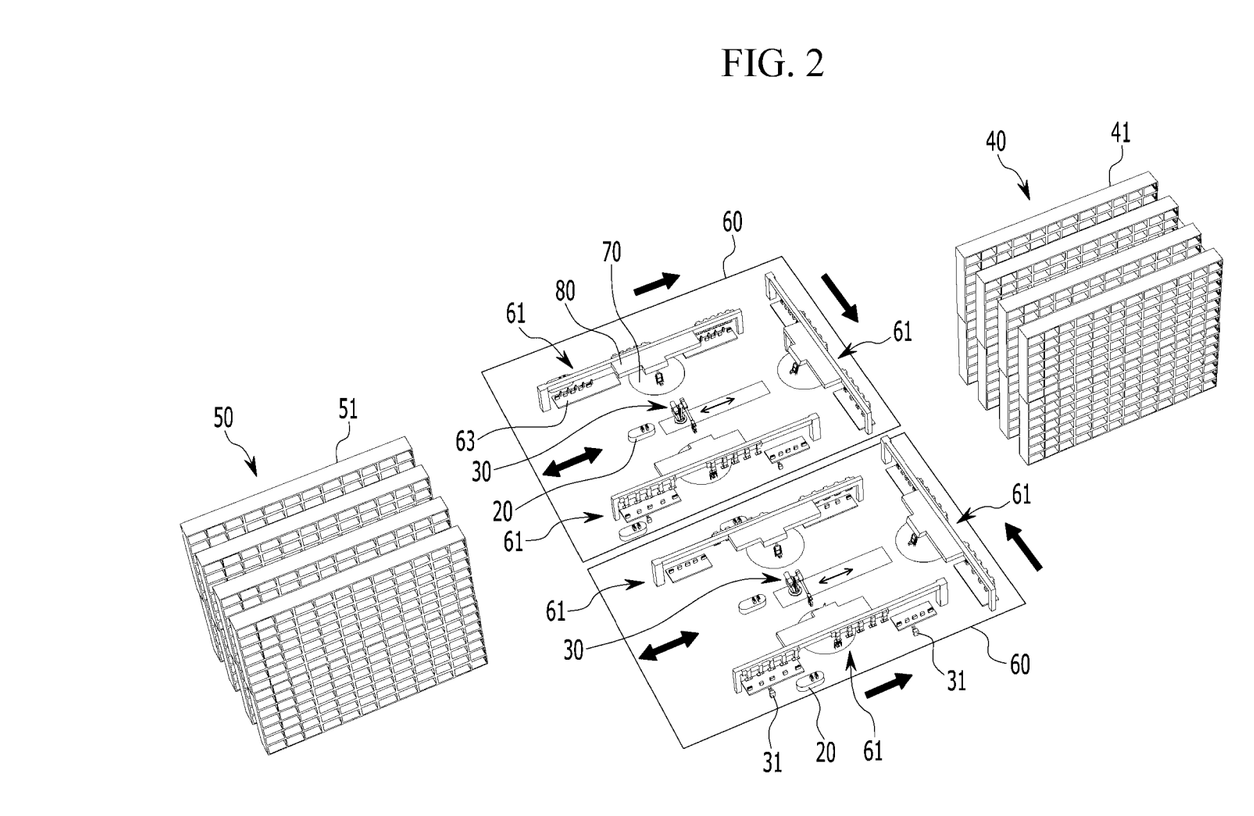
FIG. 2 is an overall schematic diagram of a system for stacking fuel cells according to an exemplary embodiment.

FIG. 2 is an overall schematic diagram of a system for stacking the fuel cells 10 according to an exemplary embodiment.

Referring to FIG. 2, a system for stacking the fuel cells 10 according to an exemplary embodiment includes a component part storage region 40, a finished product storage region 50, and a stacking region 60.

The component part storage region 40 is a region that stores the fuel cells 10.

The component part storage region 40 may include a first tray 41 that is multi-layered to store various types of the fuel cells 10.

The first tray 41 includes a plurality of compartments disposed horizontally and vertically, and each fuel cell 10 may be stored in each compartment In addition, the finished product storage region 50 is a region that stores the fuel cell stack 1 completed in the stacking region 60 and transferred by the automated guided vehicle (AGV) 20.

The finished product storage region 50 may include a second tray 51 that is multi-layered to store a plurality of types of the fuel cell stack 1.

The second tray 51 includes a plurality of compartments disposed horizontally and vertically, and each fuel cell stack 1 may be stored in each compartment At this time, a first transfer robot 30 assembles and packages the fuel cell stack 1 stacked in the stacking region 60, and transfers the fuel cell stack 1 to the automated guided vehicle 20.

The first transfer robot 30 may clamp the fuel cell stack 1 through a robot arm while moving between the stacking units 61.

In a variation, the first transfer robot 30 may be fixed to the preset position, e.g., a central portion, of the stacking units 61 and configured to clamp the fuel cell stack 1 through the robot arm.

In addition, the automated guided vehicle 20 may include a first automated guided vehicle 20 moving between the component part storage region 40 and the stacking region 60 and a second automated guided vehicle 20 moving between the first transfer robot 30 and the finished product storage region 50.

The first and second automated guided vehicles 20 moves along preset paths, respectively.

In the present disclosure, the automated guided vehicle 20 is described to include the first automated guided vehicle 20 and the second automated guided vehicle 20, however, the present embodiment is not limited thereto. It may be understood that one automated guided vehicle 20 may be configured to move between the component part storage region 40, the stacking region 60, and the finished product storage region 50.

Figure 3:
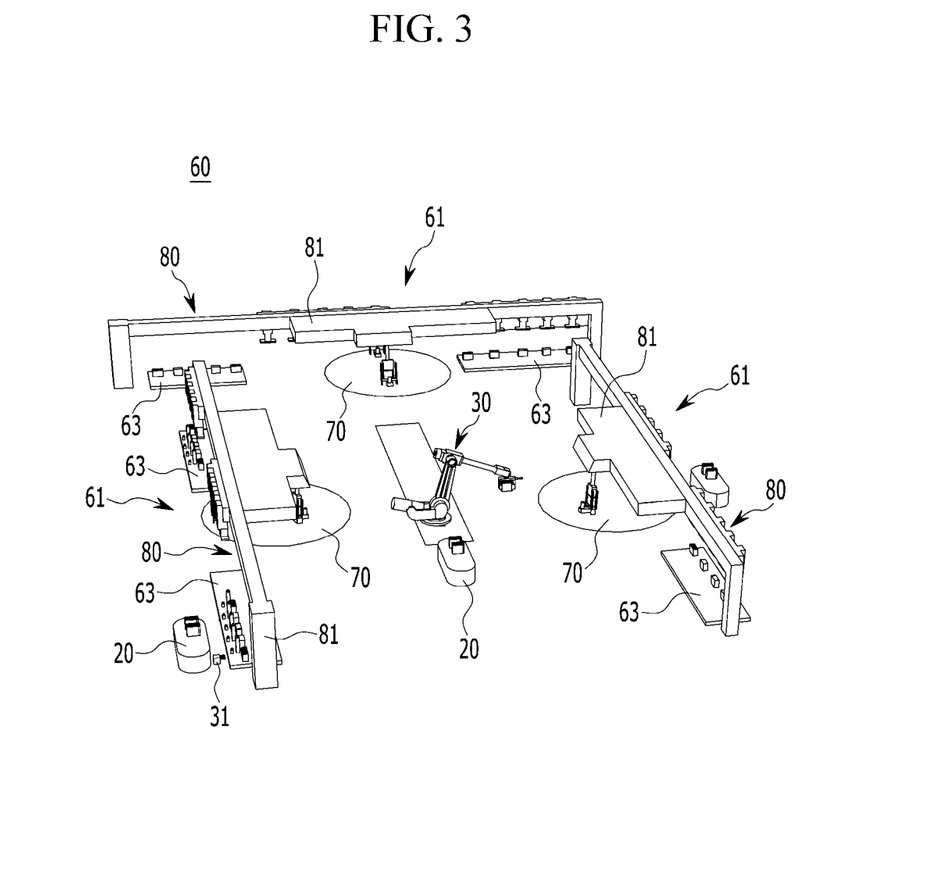
FIG. 3 is a schematic diagram of a stacking region applied to a system for stacking fuel cells according to an exemplary embodiment.
Figure 4:
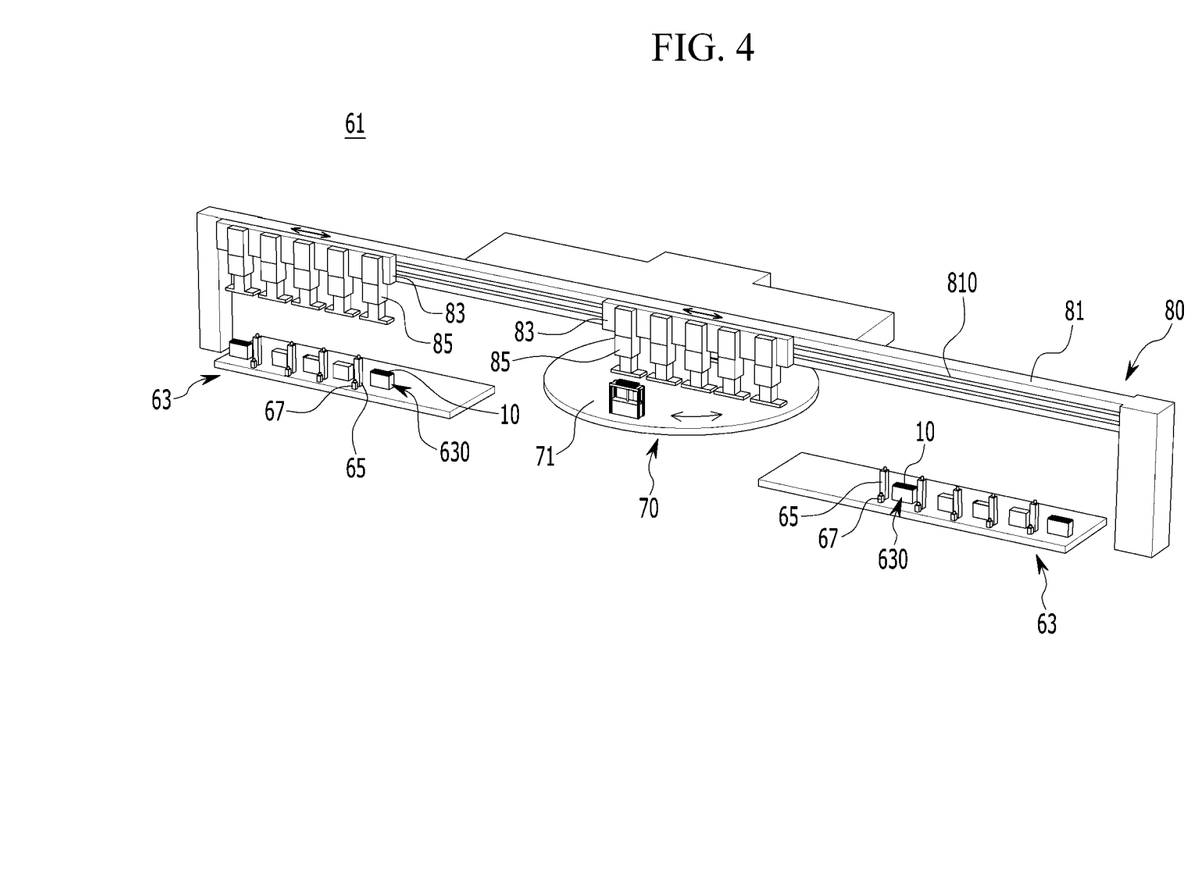
FIG. 4 is a schematic diagram of a stacking unit applied to a system for stacking fuel cells according to an exemplary embodiment.

FIG. 3 is a schematic diagram of the stacking region 60 applied to a system for stacking the fuel cells 10 according to an exemplary embodiment. FIG. 4 is a schematic diagram of a stacking unit 61 applied to a system for stacking the fuel cells 10 according to an exemplary embodiment.

A plurality of stacking regions 60 are disposed between the component part storage region 40 and the finished product storage region 50.

The stacking region 60 is disposed to be supplied with the fuel cells 10 from the component part storage region 40 by the automated guided vehicle 20.

That is, the stacking region 60 may be disposed such that movement of the automated guided vehicle 20 may be minimized.

The plurality of stacking region 60 may be disposed at adjacent positions with a same configuration.

Referring to FIG. 3, the stacking region 60 includes a plurality of stacking units 61 that is supplied with the fuel cells 10 from the component part storage region 40 by the automated guided vehicle 20 and configured to sequentially stack the fuel cells 10 to manufacture the fuel cell stack 1.

The first transfer robot 30 is centrally disposed in the stacking region 60. One side of the stacking region 60 corresponding to the finished product storage region 50 is formed as an entry and exit for the automated guided vehicle 20 for the fuel cell stack 1. The stacking unit 61 is disposed at each of remaining sides of the stacking region 60.

For example, in the stacking region 60, one side of each stacking region 60 corresponding to the finished product storage region is formed as an entry and exit for the at least one automated guided vehicle 20 for the fuel cell stack, and the stacking unit 61 having a same configuration is disposed at each of remaining sides of each stacking region 60.

The stacking unit 61 may be configured to be supplied with and sequentially stack the fuel cells 10 to form the fuel cell stack 1, and package to finish the fuel cell stack 1 by the first transfer robot 30, e.g., by assembling with fasteners such as bolts.

For such a purpose, referring to FIG. 4, each stacking unit 61 includes, a pair of loading portions 63, a stacking portion 70, and a transferring portion 80 disposed adjacent to the stacking unit 61.

Each of the pair of loading portions 63 is configured to seat the fuel cells 10 supplied from the at least one automated guided vehicle 20.

At this time, each loading portion 63 may be supplied with the fuel cells 10 transferred by the automated guided vehicle 20, through a second transfer robot 31.

The pair of loading portions 63 are formed in the same configuration, and one loading portion 63 will be described as an example.

Figure 5:
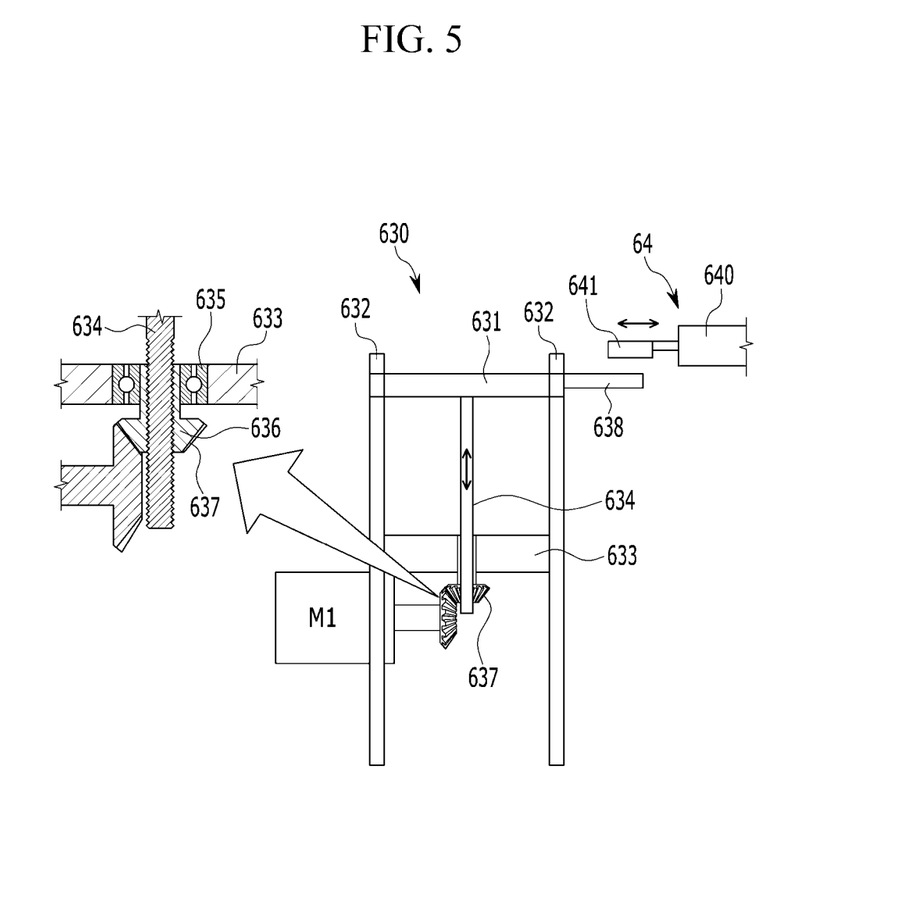
FIG. 5 and FIG. 6 are a schematic diagram of a loading portion applied to a system for stacking fuel cells according to an exemplary embodiment.
Figure 6:
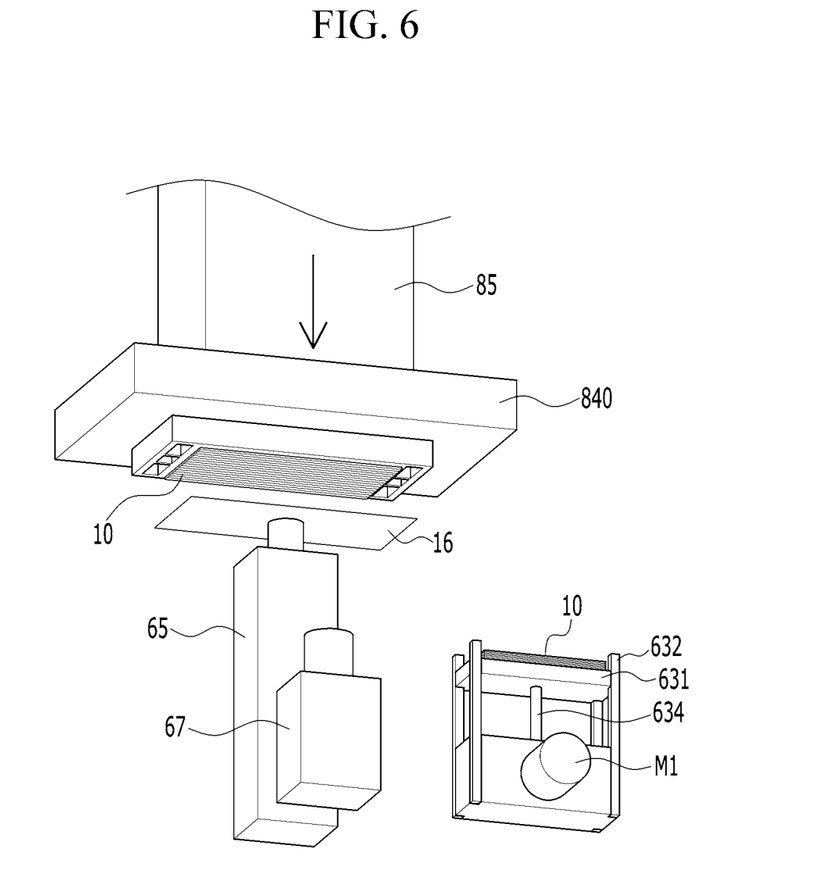

FIG. 5 and FIG. 6 are respectively a schematic diagram of the loading portion 63 applied to a system for stacking the fuel cells 10 according to an exemplary embodiment.

Referring to FIG. 5, the loading portion 63 includes a plurality of loading tables 630 that vertically operate as the fuel cell 10 is stacked.

The quantity of the loading table 630 may be set depending on the types of the fuel cell 10.

The loading table 630 includes a first upper plate 631, a first guider bar 632, a first lower plate 633, a first screw shaft 634, and a first servo-motor M1.

The loading table 630 is configured to stack the fuel cells 10 on the first upper plate 631.

A plurality of first guider bars 632 are installed to penetrate the first upper plate 631.

For example, the first upper plate 631 may be formed in a shape corresponding to the fuel cells 10, e.g., in a rectangular shape.

The first guider bars 632 may be mounted on each corner of the first upper plate 631 such that the fuel cells 10 stacked on the upper surface of the first upper plate 631 may be aligned by the first guide bars 632.

In addition, the first lower plate 633 is disposed below the first upper plate 631.

The first lower plate 633 is apart from the first upper plate 631 and fixed to the first guider bar 632.

The first screw shaft 634 is installed at a central portion of a lower surface of the first upper plate 631.

Below the first upper plate 631, the first screw shaft 634 is engaged with a first screw housing 636 that is rotatably mounted on the first lower plate 633 through the first bearing housing 635.

At this time, a first bevel gear 637 is disposed at the first screw shaft 634, and connected to the first servo-motor M1.

That is, the first servo-motor M1 is engaged with the first bevel gear 637 and configured to apply torque to the first screw shaft 634 through the first screw housing 636 to vertically operate the first upper plate 631.

The height of the first upper plate 631 is adjusted as the fuel cells 10 are stacked, and the loading table 630 is provided with a first height sensor 64 used to adjust the height.

A first auxiliary plate 638 is fixed to a side surface of the first upper plate 631, and the first height sensor 64 is configured to operate forward and backward with respect to the first auxiliary plate 638 and measure the height of the first upper plate 631 by measuring a relative distance to the first auxiliary plate 638.

For example, the first height sensor 64 may include a first linear scale 641 operated by a first air cylinder 640.

That is, the moving distance that the first auxiliary plate 638 moving with the first upper plate 631 may be measured by the first linear scale 641.

Consequently, it is possible to measure the number of fuel cells 10 stacked on the upper surface of the first upper plate 631.

In addition, a vacuum adsorber 65 is disposed adjacent to the loading table 630.

Referring to FIG. 6, the vacuum adsorber 65 may remove a slip sheet 16 of the fuel cell 10 transferred from the adjacent loading table 630 through vacuum adsorption.

A vision camera 67 is disposed adjacent, specifically attached in this embodiment, to the vacuum adsorber 65.

The vision camera 67 is configured to picture the fuel cell 10 from which the slip sheet 16 has been removed such that visual inspection of the removal of the slip sheet 16 may be available.

The vacuum adsorber 65 and the vision camera 67 may be configured to operate when the slip sheet 16 is attached to the fuel cell 10.

In addition, the stacking portion 70 is formed between the pair of loading portions 63.

Figure 7:
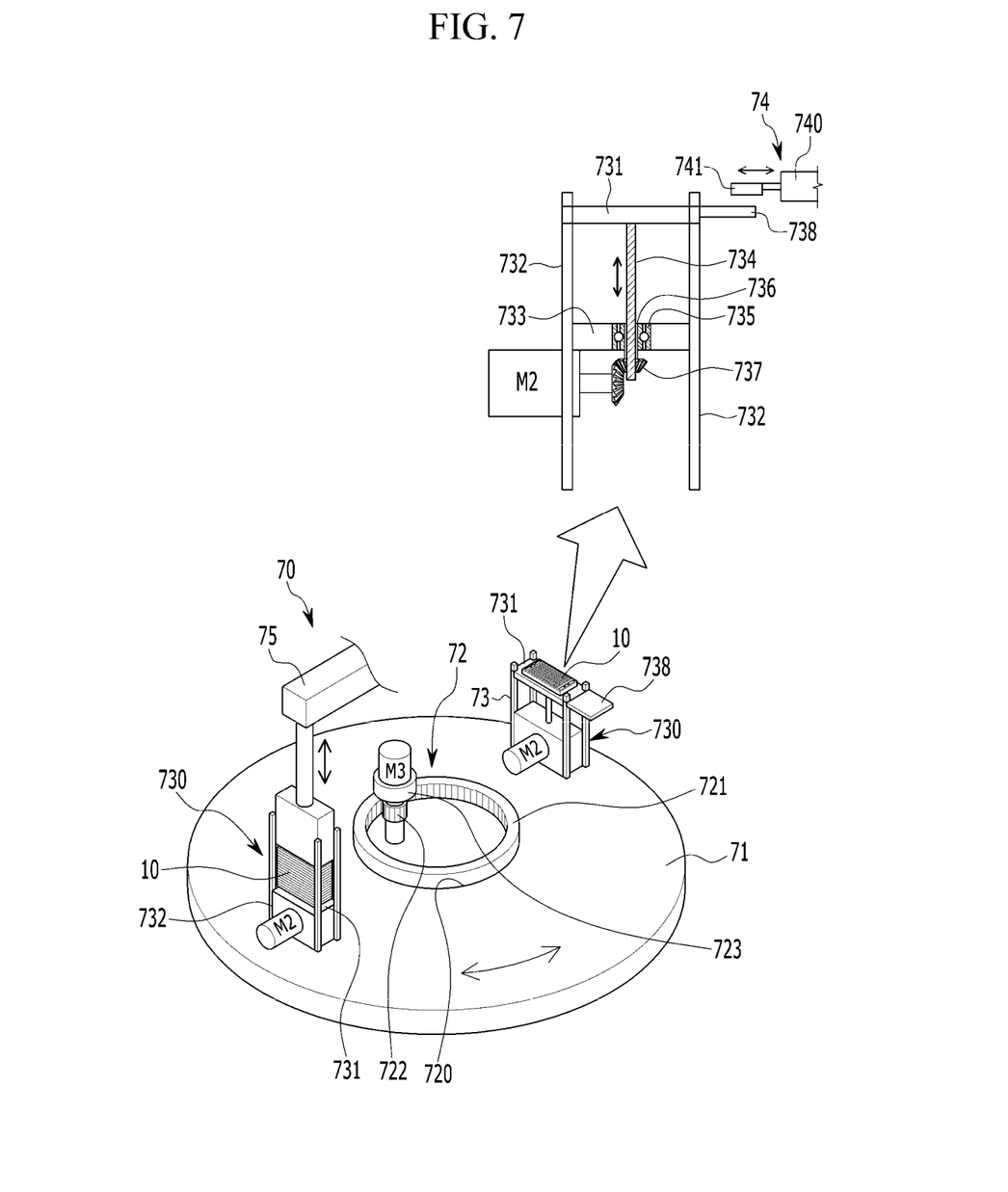
FIG. 7 is a schematic diagram of a stacking portion applied to a system for stacking fuel cells according to an exemplary embodiment.

FIG. 7 is a schematic diagram of the stacking portion 70 applied to a system for stacking the fuel cells 10 according to an exemplary embodiment.

Referring to FIG. 7, in the stacking portion 70, the fuel cells 10 transferred from the loading portion 63 are sequentially stacked.

That is, the fuel cells 10 are supplied from the component part storage region 40 to the loading table 630, and the fuel cells 10 seated on the loading table 630 are transferred to and sequentially stacked in the stacking portion 70.

The stacking portion 70 includes a rotation plate 71, a stacking table 730, and a tester 75.

The rotation plate 71 is disposed between the pair of loading portions 63.

The rotation plate 71 rotates through a rotation portion 72 configured at a central portion of the rotation plate 71 where a penetration hole 720 is formed.

The rotation portion 72 includes a first rack gear 721 formed on an interior circumference of the penetration hole 720.

In addition, the first rack gear 721 is engaged with a first drive gear 722.

The first drive gear 722 is connected to a third servo-motor M3, which transmits a driving torque to the first drive gear 722.

In addition, a reducer 723 is interposed between the third servo-motor M3 and the first drive gear 722 to reduce the rotation speed of the third servo-motor M3 such that the rotation speed of the rotation plate 71 may be finely controlled by the third servo-motor M3.

A pair of stacking tables 730 are opposingly disposed on an upper surface of the rotation plate 71.

At this time, the stacking table 730 may be positioned at a position below the traveling path of the transferring portion 80 moving between the loading portion 63 and the stacking portion 70.

The fuel cells 10 transferred by the transferring portion 80 are sequentially stacked on the stacking table 730 to a preset quantity.

The stacking table 730 vertically operates as the fuel cells 10 are stacked.

The stacking table 730 may be formed in the same configuration as the loading table 630, and is not described in further detail.

As shown in FIG. 7, the stacking table 730 includes a second upper plate 731, a second guider bar 732, a second lower plate 733, a second screw shaft 734, a second bearing housing 735, a second screw housing 736, a second bevel gear 737, a second auxiliary plate 738, a second servo-motor M2, a second height sensor 74, a second air cylinder 740, and a second linear scale 741.

For details of the second upper plate 731, the second guider bar 732, the second lower plate 733, the second screw shaft 734, the second bearing housing 735, the second screw housing 736, the second bevel gear 737, the second auxiliary plate 738, the second servo-motor M2, the second height sensor 74, the second air cylinder 740, and the second linear scale 741, the above description in connection with the first upper plate 631, the first guider bar 632, the first lower plate 633, the first screw shaft 634, the first bearing housing 635, the first screw housing 636, the first bevel gear 637, the first auxiliary plate 638, the first servo-motor M1, the first height sensor 64, the first air cylinder 640, and the first linear scale 641 may be referred to.

When the preset quantity of the fuel cells 10 are stacked the stacking table 730, the rotation plate 71 is rotated by 180 degrees to position the stacking table 730 stacked with the fuel cells 10 to an opposition position.

When the stacking table 730 stacked with the preset quantity of fuel cells 10 is positioned to the opposite position by the rotation of the rotation plate 71, the stacking table 730 is connected to the tester 75.

The tester 75 is disposed above the rotation plate 71, to be positioned opposite to the traveling path of the transferring portion 80.

The tester 75 is to perform a leakage test of the stacked fuel cells 10, and may be mounted on a frame 81 on which the transferring portion 80 is mounted.

When the stacking table 730 having stacked the preset quantity of fuel cells 10 is positioned at a home position by the rotation of the rotation plate 71, the tester 75 moves downward to the stacking table 730 and is connected to the stacking table 730.

At this time, the tester 75 may be inserted between the second guider bars 732.

The tester 75 is configured to inject gas into the fuel cells 10 stacked on the stacking table 730, for the leakage test.

The transferring portion 80 is formed between the loading portion 63 and the stacking portion 70 described above.

Figure 8:
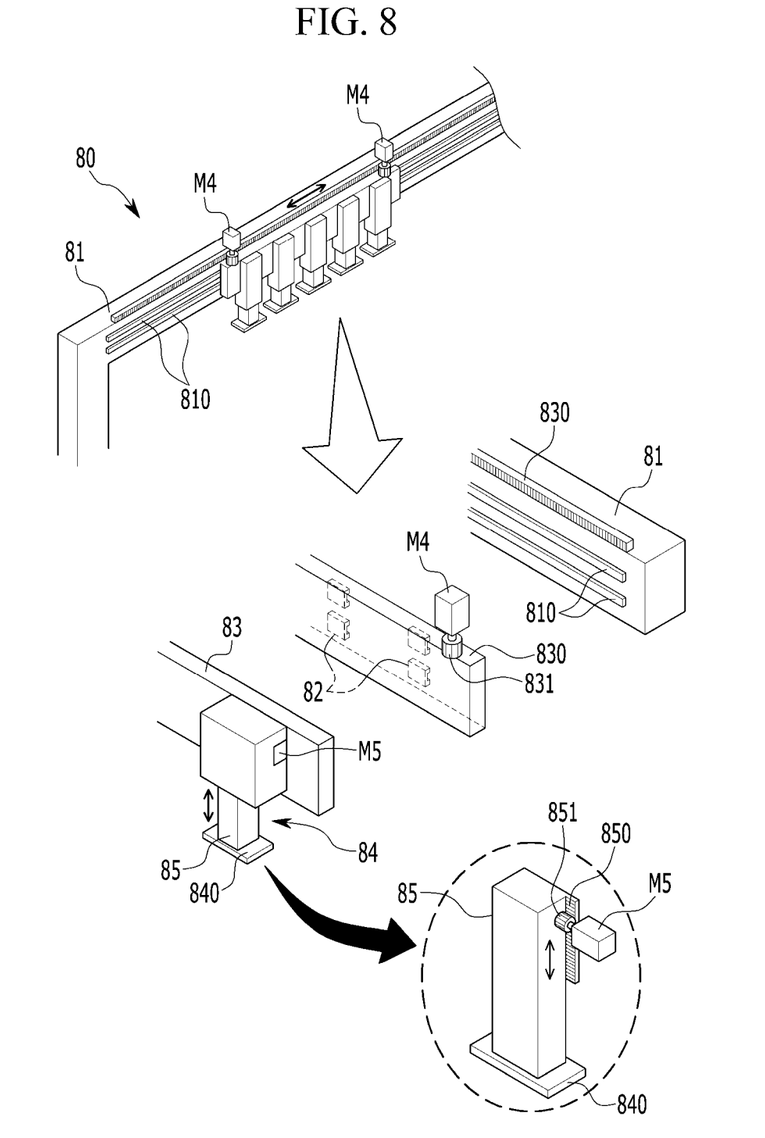
FIG. 8 is a schematic diagram of a transferring portion applied to a system for stacking fuel cells according to an exemplary embodiment.

FIG. 8 is a schematic diagram of the transferring portion 80 applied to a system for stacking the fuel cells 10 according to an exemplary embodiment.

Referring to FIG. 8, the transferring portion 80 may, while moving between the loading portion 63 and the stacking portion 70, simultaneously clamp the fuel cells 10 loaded in the loading portion 63 and stack the clamped fuel cells 10 in the stacking portion 70.

For such a purpose, the transferring portion 80 is slidably mounted on the frame 81 disposed above the pair of loading portions 63.

At this time, a rail 810 is formed on the frame 81 along the length direction.

The transferring portion 80 includes an LM guide 82 that is slidably mounted on the rail 810.

A horizontal movement block 83 is mounted on the LM guide 82.

A second rack gear 830 is formed on the frame 81, and the horizontal movement block 83 is configured to be movable by a fourth servo-motor M4 mounted on the upper portion of the horizontal movement block 83.

In more detail, the fourth serve-motor M4 is connected to a second drive gear 831 and the second drive gear 831 is engaged with the second rack gear 830. In this configuration, when the fourth serve-motor M4 applies driving torque to the second drive gear 831, the second drive gear 831 rotates to travel on the second rack gear 830, and thereby the horizontal movement block 83 may move.

In addition, a plurality of adsorbers 84 are installed in the horizontal movement block 83.

The plurality of adsorbers 84 directly contact the fuel cell 10 loaded in the loading portion 63, and are configured to simultaneously vacuum adsorb the fuel cells 10, so as to be transferred to and stacked in the stacking portion 70.

The adsorber 84 includes an adsorption plate 840, a vertical movement block 85, and a fifth servo-motor M5.

The adsorption plate 840 is configured to clamp and unclamp the fuel cell 10 through vacuum adsorption.

The adsorption plate 840 may be formed in a rectangular shape corresponding to the fuel cell 10.

The vertical movement block 85 is connected to an upper portion of the adsorption plate 840.

The vertical movement block 85 is formed in a rectangular pillar shape that is vertically aligned, and may vertically operate through a third rack gear 850 that is vertically arranged and a third drive gear 851 that is engaged with the third rack gear 850.

In addition, the fifth servo-motor M5 is fixed to the horizontal movement block 83 and may apply driving torque to the third drive gear 851.

Accordingly, the transferring portion 80 may transfer the fuel cell 10 to the home position while the horizontal movement block 83 horizontally moves and the vertical movement block 85 vertically operates.

When the leakage test by the tester 75 is completed, the fuel cell 10 may be assembled or packaged to a completed fuel cell stack 1 by the first transfer robot 30.

Therefore, according to a system for stacking the fuel cells according to an exemplary embodiment, a production line may be formed from supplying of the fuel cell to storing the completed fuel cell stack, and thereby it is possible to reduce labor costs and improve production quality.

In addition, according to a system for stacking the fuel cells 10 according to an exemplary embodiment, by optimally designing arrangement of working regions, move- ments of the first transfer robot 30 may be minimized. In addition, by disposing a loading portion at both sides of the stacking portion and employing a rotation plate, overall cycle time may be reduced, and productivity may be improved.

In addition, according to a system for stacking the fuel cells 10 according to an exemplary embodiment, a stack height of the fuel cell may be measured and controlled in real time, so the stack status of the fuel cell may be checked in rear time.

In addition, according to a system for stacking the fuel cells 10 according to an exemplary embodiment, lean production is possible, and there is an advantage in inventory management.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A system for stacking fuel cells for a fuel cell stack, comprising:
a component part storage region configured to store the fuel cells;
a finished product storage region configured to store a completed fuel cell stack transferred by at least one automated guided vehicle (AGV); and
a plurality of stacking regions disposed between the component part storage region and the finished product storage region,
wherein a first transfer robot is located at a central portion of each of the plurality of stacking regions,
wherein a first side of each of the plurality of stacking regions corresponding to the finished product storage region is formed as an entry and exit for the at least one automated guided vehicle for the fuel cell stack,
wherein a stacking unit is disposed at a second side, a third side, and a fourth side of each of the plurality of stacking regions, and
wherein each of the plurality of stacking regions is supplied with the fuel cells from the component part storage region by the at least one automated guided vehicle to sequentially stack the fuel cells to manufacture the fuel cell stack.

2. The system of claim 1, wherein the component part storage region comprises a first tray that is multi-layered to store a plurality of types of fuel cells.

3. The system of claim 1, wherein the finished product storage region comprises a second tray that is multi-layered to store the fuel cell stack.

4. The system of claim 1, wherein the first transfer robot is configured to assemble and package the fuel cell stack stacked in each of the plurality of stacking regions, and transfers the fuel cell stack to the at least one automated guided vehicle.

5. The system of claim 1, wherein the at least one automated guided vehicle comprises a first automated guided vehicle moving between the component part storage region and the plurality of stacking regions and a second automated guided vehicle moving between the first transfer robot and the finished product storage region.

6. The system of claim 1, wherein each stacking unit comprises:

a pair of loading portions each configured to seat the fuel cells supplied from the at least one automated guided vehicle;

a stacking portion disposed between the pair of loading portions, and configured to sequentially stack the fuel cells transferred from the loading portion; and a transferring portion slidably mounted on a frame disposed above the pair of loading portions, and configured to, while moving between the loading portion and the stacking portion, simultaneously clamp fuel cells loaded in the loading portion and stack the clamped fuel cells in the stacking portion.

7. The system of claim 6, wherein each loading portion comprises:

a plurality of loading tables that vertically operate as the fuel cell is stacked;

a vacuum adsorber disposed adjacent to the loading table, and configured to remove a slip sheet of the fuel cell transferred from a corresponding loading table, through vacuum adsorption; and a vision camera disposed adjacent to the vacuum adsorber, and configured to picture the fuel cell removed with the slip sheet.

8. The system of claim 7, wherein each loading table comprises:

a first upper plate on which the fuel cells are stacked;

a plurality of first guider bars installed to penetrate the first upper plate and configured to align the fuel cells stacked on the first upper plate;

a first lower plate disposed below the first upper plate and fixed to the plurality of first guider bars;

a first screw shaft installed at a central portion of a lower surface of the first upper plate, engaged with a first screw housing that is rotatably mounted on the first lower plate through a first bearing housing, and formed with a first bevel gear; and a first servo-motor engaged with the first bevel gear of the first screw shaft and configured to apply torque to the first screw shaft through the first screw housing to vertically operate the first upper plate.

9. The system of claim 8, wherein the loading table further comprises a first height sensor configured to operate forward and backward with respect to a first auxiliary plate fixed to the first upper plate and measure the height of the first upper plate.

10. The system of claim 6, wherein the stacking portion comprises:

a rotation plate disposed between the pair of loading portions, and configured to rotate through a rotation portion configured at a central portion of the rotation plate where a penetration hole is formed;

a pair of stacking tables disposed at opposite sides of the rotation plate, and configured to sequentially stack the fuel cells transferred by the transferring portion to a preset quantity of fuel cells and vertically operate as the fuel cells are stacked; and a tester configured to perform a leakage test for the fuel cells stacked on one of the pair of stacking tables when connected to the one of the pair of stacking tables having stacked the preset quantity of fuel cells by the rotation of the rotation plate.

11. The system of claim 10, wherein the rotation portion comprises:

a first rack gear formed at an interior circumference of the penetration hole;

a first drive gear engaged with the first rack gear;

a third servo-motor connected to the first drive gear and configured to transmit driving torque to the first drive gear; and a reducer connected to the third servo-motor and configured to reduce a rotation speed of third servo-motor.

12. The system of claim 10, wherein each of the pair of stacking tables comprise a second upper plate on which the fuel cells are stacked;

a plurality of second guider bars installed to penetrate the second upper plate and configured to align the fuel cells stacked on the second upper plate;

a second lower plate disposed below the second upper plate and fixed to the plurality of second guider bars;

a second screw shaft installed at a central portion of a lower surface of the second upper plate, and configured to vertically operate by being engaged with a second screw housing that is rotatably mounted on the second lower plate through a second bearing housing; and a second servo-motor engaged with a second bevel gear formed at a frontal end portion of the second screw housing, and configured to apply torque to the second screw shaft through the second screw housing to vertically operate the second upper plate.

13. The system of claim 12, wherein each of the pair of stacking tables further comprises a second height sensor configured to operate forward and backward with respect to a second auxiliary plate fixed to the second upper plate, and measure a position of the second upper plate.

14. The system of claim 10, wherein the tester is mounted on the frame, and configured to, when the stacking table is positioned to a home position by the rotation of the rotation plate, move downward to the stacking table to be connected to the stacking table and inject gas into the fuel cells stacked on the stacking table.

15. The system of claim 6, wherein the transferring portion comprises an LM guide slidably mounted on a rail of the frame;

a horizontal movement block mounted on the LM guide, and configured to be movable by a second rack gear and a second drive gear engaged with the second rack gear;

a fourth servo-motor mounted on the horizontal movement block, and configured to apply a driving torque to the second drive gear; and a plurality of adsorbers installed on the horizontal movement block, and configured to simultaneously vacuum adsorb the fuel cells loaded in the loading portion and stack the adsorbed fuel cells in the stacking portion.

16. The system of claim 15, wherein each of the plurality of adsorbers comprises an adsorption plate configured to clamp and unclamp the fuel cell through vacuum adsorption and release;

a vertical movement block connected to an upper portion of the adsorption plate, and configured to vertically operate through a third rack gear and a third drive gear engaged with the third rack gear; and a fifth servo-motor fixed to the horizontal movement block, and configured to apply a driving torque to the third drive gear.

* * * * *